United States Patent [19]

Matsuo

[11] Patent Number: 4,943,859
[45] Date of Patent: Jul. 24, 1990

[54] CIRCUIT FOR PRODUCING CLAMP PULSE HAVING PULSE WIDTH RESPONSE TO THE FREQUENCY OF A SYNCHRONIZING SIGNAL

[75] Inventor: Noriaki Matsuo, Asahi, Japan

[73] Assignee: Mitsubishi Denki Kabushiki Kaisha, Tokyo, Japan

[21] Appl. No.: 341,628

[22] Filed: Apr. 21, 1989

[30] Foreign Application Priority Data

Jul. 27, 1988 [JP] Japan ................. 63-185448

[51] Int. Cl.$^5$ .................. H04N 5/16; H04N 5/18; H04N 9/72
[52] U.S. Cl. ..................... 358/172; 358/34; 358/171
[58] Field of Search ............. 358/171, 172, 34, 148, 358/160; 307/546

[56] References Cited

U.S. PATENT DOCUMENTS

| 3,003,028 | 10/1961 | Suhrmann | 358/172 |
| 3,145,263 | 8/1964 | Barnard | 358/172 |
| 3,246,080 | 4/1966 | Ritchey, Jr. | 358/172 |
| 3,670,100 | 6/1972 | Briggs et al. | 358/172 |
| 3,819,859 | 6/1974 | Borsuk et al. | 358/172 |
| 4,215,371 | 7/1980 | Baggett et al. | 358/172 |
| 4,583,121 | 4/1986 | Yost | 358/172 |

FOREIGN PATENT DOCUMENTS

| 0278007 | 8/1988 | European Pat. Off. |
| 61-176866 | 11/1986 | Japan |
| 62-8987 | 2/1987 | Japan |
| 62-85577 | 4/1987 | Japan |
| 2129249 | 5/1984 | United Kingdom |

Primary Examiner—John K. Peng
Attorney, Agent, or Firm—Oblon, Spivak, McClelland, Maier & Neustadt

[57] ABSTRACT

A microcomputer (11) supplies pulse width data (12) which is responsive to the frequency of a synchronizing signal (SS). A flip-flop (14) is set on the trailing edge of the synchronizing signal (SS). A counter (15) counts clock pulses (18) in a high-level period of output from the flip-flop (14), and supplies the result of measurement (19) to a comparator (13). The comparator (13) compares the pulse width data (12) with the result of measurement (19), and supplies a reset signal (20) to the flip-flop (14) upon a judgement on coincidence. The flip-flop (14) is reset in response to the reset signal (20). Thus, the pulse width of a clamp pulse (CS) outputted from the flip-flop (14) can be controlled on the basis of the pulse width data (12).

8 Claims, 6 Drawing Sheets

CIRCUIT FOR PRODUCING CLAMP PULSE HAVING PULSE WIDTH RESPONSE TO THE FREQUENCY OF A SYNCHRONIZING SIGNAL

BACKGROUND OF THE INVENTION

1. Field of the invention

The present invention relates to a clamp pulse producing circuit which is contained in a DC restoration circuit for producing clamp pulses for restoring DC components in composite video signals.

2. Description of the Background Art

In an image amplifying stage of a display monitor or the like, capacitor coupling is generally employed in an input end and hence DC components are lost from respective video signals, to change pedestal levels of the video signals. Thus, the entire image is disturbed in contrast such that the color of a portion to be in white is changed into gray, for example. In order to prevent this, DC restoration may be performed on the video signals losing the DC components, to thereby uniformalize the pedestal levels of the respective video signals. A DC restoration circuit has been generally employed in order to restore such DC components by clamp pulses.

FIG. 1 is a block diagram showing a conventional clamp pulse generator contained in a DC restoration circuit of a display monitor by Mitsubishi Denki Kabushiki Kaisha, product No. FA3415ATK, for producing the aforementioned clamp pulses.

A signal input terminal 1 receives a synchronizing signal SS, such as a horizontal synchronizing signal, included in a video signal VS shown in FIG. 2. A monostable multi vibrator 2, which is connected to the signal input terminal 1, is triggered on the trailing edge of the synchronizing signal SS inputted from the signal input terminal 1. In response to this, a clamp pulse CS rises as shown in FIG. 2. After a lapse of a period corresponding to a time constant C1·R1, where C1 represents capacitance of a capacitor C1 and R1 represents resistance of a resistor R1, of a time constant circuit 4 which is formed by the resistor R1 and the capacitor C1, the clamp pulse CS falls as shown in FIG. 2. Namely, the pulse width of the clamp pulse CS is determined by the time constant C1·R1. The clamp pulse CS is produced every cycle of the synchronizing signal SS, so that one clamp pulse CS determines the pedestal level of one cycle of the video signal VS. In general, the clamp pulse CS must be present in the back porch of a blanking period of the video signal VS, as shown in FIG. 2.

Since the pulse width of the clamp pulse CS is fixed by the time constant C1·R1, the conventional clamp pulse producing circuit of the aforementioned structure has the following problem: In general, the back porch of a blanking period of a video signal VS including a low-frequency synchronizing signal SS is long while that of a video signal VS including a high-frequency synchronizing signal SS is short. Thus, in the case of restoring DC components of video signals VS including synchronizing signals SS of various frequencies, the pulse width of a clamp pulse CS may exceed the back porch width of a blanking period of a video signal VS when a synchronizing signal SS is at a high frequency, whereby a DC component is insufficiently restored to disturb the constrast of an image.

SUMMARY OF THE INVENTION

The present invention directed to a clamp pulse producing circuit contained in DC restoration means for produce a clamp pulse for use in restoring a DC component lost from a video signal. According to the present invention, a clamping pulse producing cirucit comprises a first input means for receiving a synchronizing signal included in the video signal, pulse width data output means connected to the first input means for outputting pulse width data responsive to a frequency of the synchronizing signal, a flip-flop having first and second output states, which is connected to the first input means to enter a first output state in response to a trailing edge of the synchronizing signal, measuring means connected to the flip-flop for measurinig a period of the first output state of the flip-flop to output a result of measurement, and judging means connected to the pulse width data output means, the measuring means and the flip-flop for judging whether or not the pulse width data coincides with the result of measurement to output a first signal for bringing the flip-flop into the second output state upon a judgement on coincidence.

Since a clamp pulse producing circuit according to the present invention comprises pulse width data output means for outputting pulse width data responsive to the frequency of a synchronizing signal, a flip-flop entering a first output state on the trailing edge of the synchronizing signal, measuring means for measuring the period of the first output state of output from the flip-flop to output a result of measurement, and judging means for judging whether or not the pulse width data coincides with the result of measurement to output a first signal for bringing the flip-flop into a second output state upon a judgement on coincidence, it can produce a clamp pulse which has pulse width optimum for the frequency of the synchronizing signal, even if the frequency is changed.

Accordingly, an object of the present invention is to provide a clamp pulse producing circuit, which can produce a clamp pulse having pulse width responsive to the frequency of a synchronizing signal, even if the frequency is changed.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
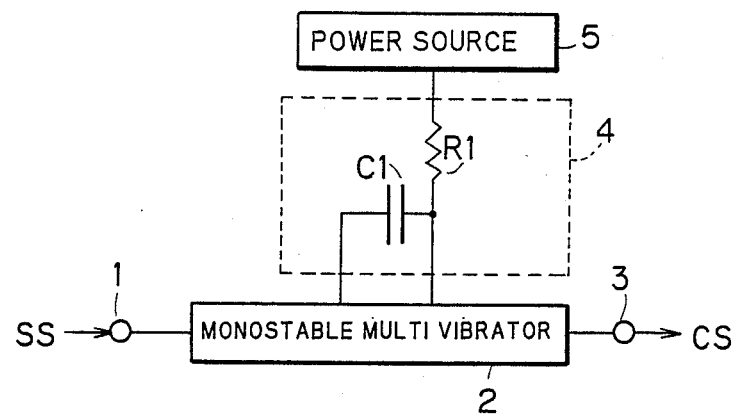
FIG. 1 is a block diagram showing a conventional clamp pulse producing circuit.
Figure 2:
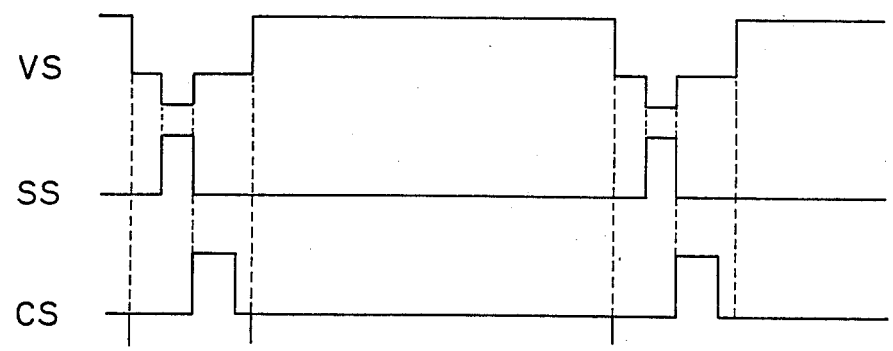
FIG. 2 is a timing chart for illustrating the operation of the circuit shown in FIG. 1.
Figure 3:
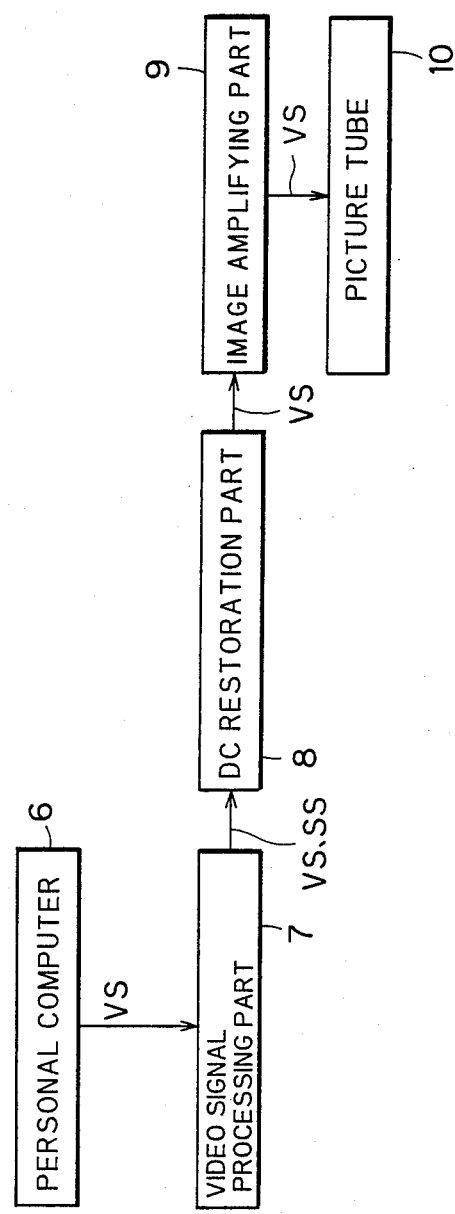
FIG. 3 is a block diagram showing the structure of an image amplifying part of a display monitor.

FIG. 3 is a block diagram showing the structure of an image amplifying stage of a display monitor such as a CAD. A personal computer 6 supplies a video signal VS to a video signal processing part 7, which in turn performs processing such as contrast control, brightness control and picture quality control on the video signal VS, to supply the same to a DC restoration part 8. The video signal processing part 7 also separates a synchronizing signal SS such as a horizontal synchronizing signal from the video signal VS, to supply the same to the DC restoration part 8. The DC restoration part 8 produces a clamp pulse CS through the synchronizing signal SS, to compensate for a DC component which is lost from the video signal VS. An image amplifying part 9 amplifies the video signal VS received from the DC restoration part 8 while performing white balance control on the video signal VS, to supply the same to a picture tube 10. The picture tube 10 projects an image corresponding to the video signal VS received from the image amplifyinig part 9.

Figure 4A:
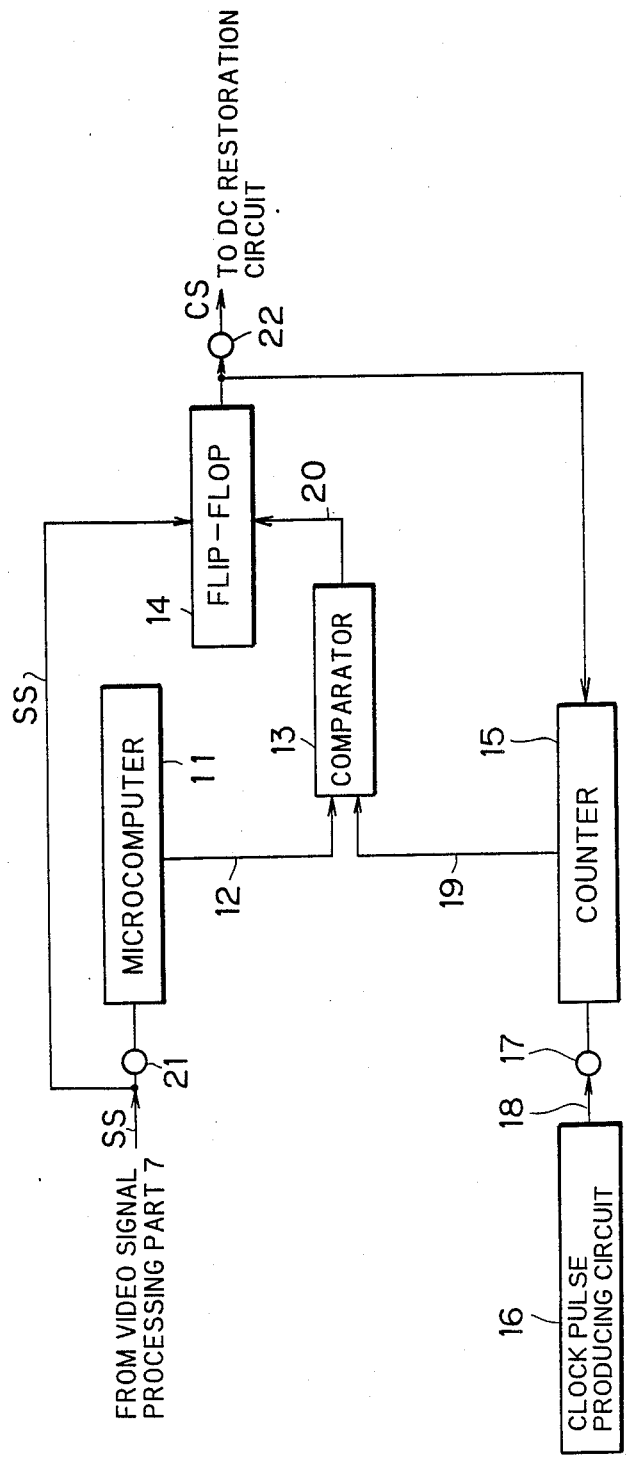
FIG. 4A is a block diagram showing an embodiment of clamp pulse producing circuit according to the present invention.
Figure 4B:
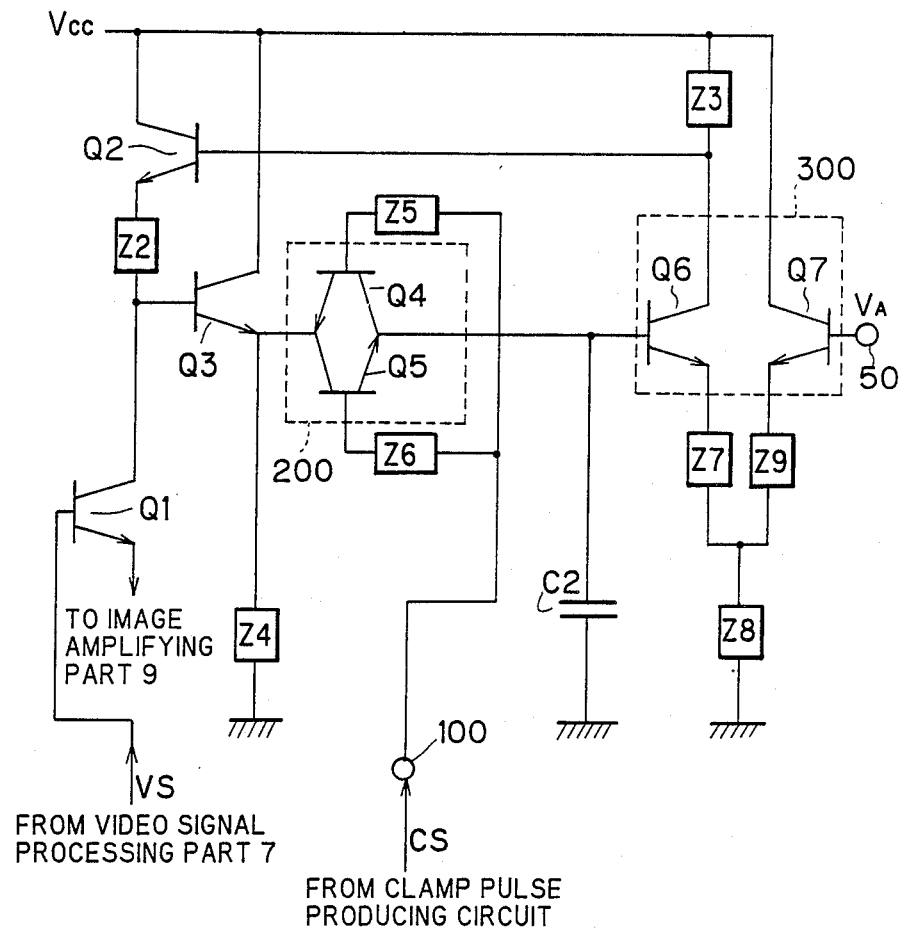
FIG. 4B is a circuit diagram showing exemplary structure of a DC restoration circuit.

The DC restoration part 8 includes a clamp pulse producing circuit and a DC restoration circuit. FIG. 4A is a block diagram showing the structure of the clamp pulse producing circuit which produces the clamp pulse CS for restoring the DC component lost from the video signal VS through the synchronizing signal SS from the video signal processing part 7. FIG. 4B is a circuit diagram showing exemplary structure of the DC restoration circuit which receives the video signal VS from the video signal processing part 7 and the clamp pulse CS from the clamp pulse producing circuit, respectively, to restore the DC component lost from the video signal VS through the clam pulse CS.

Figure 5:
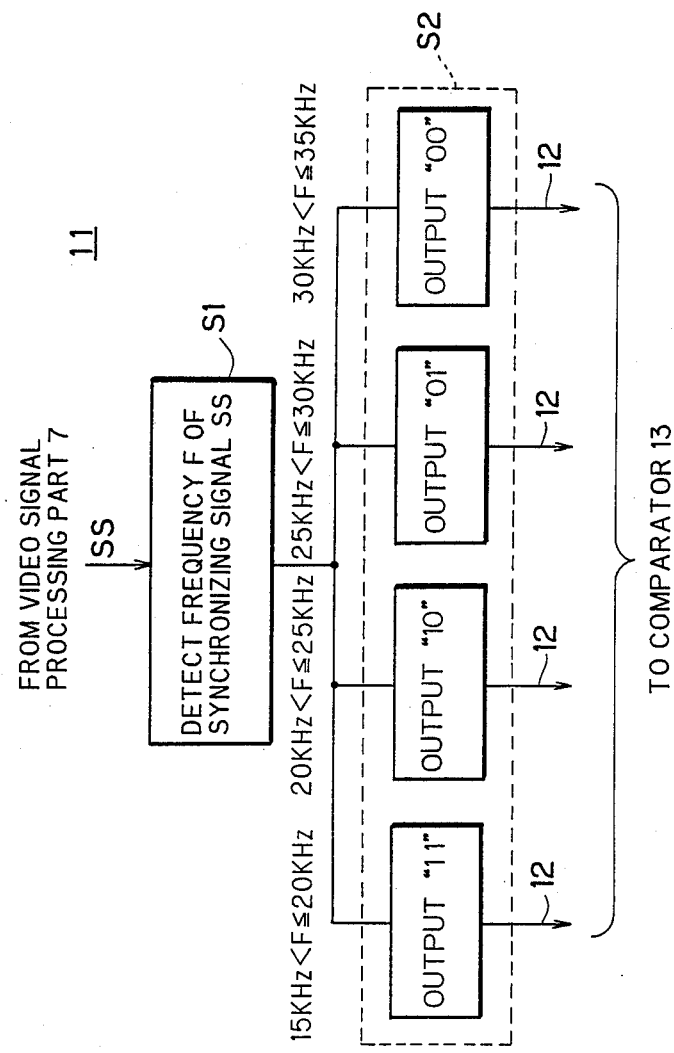
FIG. 5 is a flow chart showing the operation sequence of a microcomputer.

Referring to FIG. 4A, a microcomputer 11 receives the synchronizing signal SS from the video signal processing part 7 through a signal input terminal 21. The microcomputer 11 outputs pulse width data 12 responsive to the frequency F of the synchronizing signal SS. FIG. 5 is a flow chart showing the procedure of the microcomputer 11 for outputting the pulse width data 12 responsive to the frequency F of the synchronizing signal SS. It is assumed that the microcomputer 11 outputs a signal of two-bit structure. Upon supply of the synchronizing signal SS, the microcomputer 11 first detects the frequency F thereof at step S1. Then the microcomputer 11 outputs the pulse width data 12 in response to the frequency F of the synchronizing signal SS at step S2. FIG. 5 shows such case that the microcomputer 11 outputs "11" when the frequency F of the synchronizing signal SS is in a range of 15 KHz$<$F$\leqq$20 KHz, "10" when 20 KHz$<$F$\leqq$25 KHz, "01" when 25 KHz$<$F$\leqq$30 KHz and "00" when 30 KHz$<$F$\leqq$35 KHz as the pulse width data 12. "00" corresponds to 250 ns, "01" corresponds to 500 ns, "10" corresponds to 750 ns and "11" corresponds to 1 $\mu$s. The microcomputer 11 outputs the pulse width data 12 in the aforementioned manner, and supplies the same to a comparator 13.

A flip-flop 14, which is connected to the signal input terminal 21, is set on the trailing edge of the synchronizing signal SS. Output from the flip-flop 14 is supplied to a counter 15, which receives clock pulses 18 of a prescribed cycle from a clock pulse generator 16 through a clock pulse input terminal 17. The counter 15 starts counting on a leading edge of the output from the flip-flop 14, to count the number of the clock pulses 18 in a high-level period of the output from the flip-flop 14. Namely, the counter 15 measures the pulse width of the output from the flip-flop 14. Pulse width measurement data 19 is supplied to the comparator 13, which in turn compares the pulse width data 12 with the pulse width measurement data 19 to supply a reset signal 20 to the flip-flop 14 upon a judgement on coincidence of the data 12 and 19. The flip-flop 14 is reset in response to the reset signal 20. The clamp pulse CS is thus produced. When the cycle of the clock pulses 18 is set at 250 ns, for example, the pulse width measurement data 19 is changed as 250 ns, 500 ns, ... On the other hand, the pulse width data 12 is set at 250 ns, 500 ns, 750 ns or 1 $\mu$s, as hereinabove described. Thus, the pulse width of the clamp pulse CS outputted from an output terminal 22 is set at 250 ns, 500 ns, 750 ns or 1 $\mu$s, in response to the frequency F of the synchronizing signal SS received in the signal input terminal 21.

Referring to FIG. 4B, an NPN transistor Q1 receives the video signal VS from the video signal processing part 7 in its base. The transistor Q1 has a collector which is connected to an emitter of an NPN transistor Q2 through a load Z2, and an emitter which is connected to the image amplfying part 9. The transistor Q2 has a collector which is connected to a power source $V_{CC}$ and a base which is connected to the power source $V_{CC}$ through a load Z3 respectively.

An NPN transistor Q3 forming an emitter-follower has a base which is connected to the collector of the transistor Q1, a collector which is connected to the power source $V_{CC}$, and an emitter which is grounded through a load Z4. NPN transistors Q4 and Q5 form a gate circuit 200. The transistor Q4 has a base which is connected to a clamp pulse input terminal 100 through a load Z5, an emitter which is connected to the emitter of the transistor Q3, and a collector which is connected to an emitter of the transistor Q5. The transistor Q5 has a base which is connected to the clamp pulse input terminal 100 through a load Z6, and a collector which is connected to the emitter of the transistor Q3.

NPN transistors Q6 and Q7 form a voltage comparator 300. The transistor Q6 has a base which is connected to the collector of the transistor Q4, a collector which is connected to the base of the transistor Q2, and an emitter which is grounded through loads Z7 and Z8. A capacitor C2 is connected between the base of the transistor Q6 and the ground. The transistor Q7 has a base which is connected to a brightness control voltage input terminal 60, a collector which is connected to the power source $V_{CC}$, and an emitter which is grounded through loads Z9 and Z8. The brightness control voltage input terminal 50 receives brightness control voltage $V_A$.

Figure 6A:
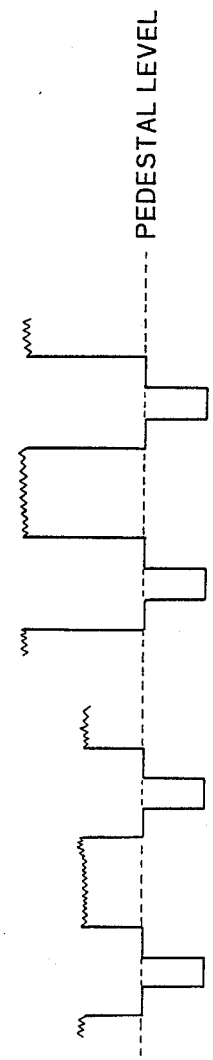
FIGS 6A and 6B are waveform diagrams for illustrating the operation of the structure shown in FIG. 3.
Figure 6B:
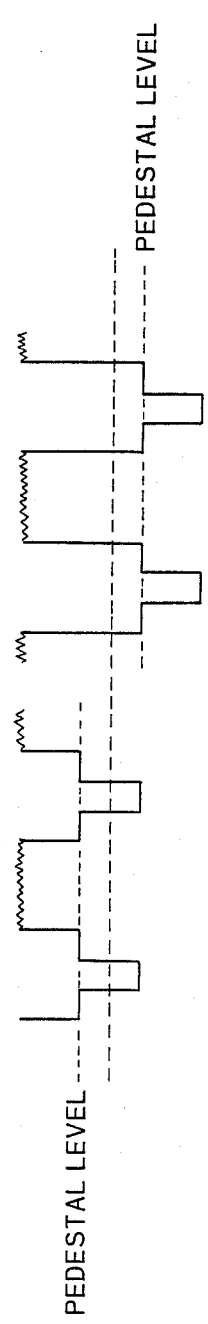

The operation of the DC restoration circuit shown in FIG. 4B will now be described. The transistor Q1 receives in its base the video signal VS, which is subjected to contrast control and the like, from the video signal processing part 7. It is assumed that the video signal VS includes two video signals which lose DC components so that pedestal levels thereof are different, as shown in FIG. 6B. The video signal VS received in the base of the transistor Q1 passes through the transistor Q3, to be supplied to the gate circuit 200, which is formed by the transistors Q4 and Q5. The clamp pulse CS is supplied to the bases of the transistors Q4 and Q5 from the clamp pulse producing circuit shown in FIG. 4A through the clamp pulse input terminal 100. The gate circuit 200 conducts only when the clamp pulse CS is at a high level. A capacitor C2 is charged in the conducting period of the gate circuit 200. The voltage comparator 300, which is formed by the transistors Q6 and Q7, compares the charging voltage of the capacitor C2 with the brightness control voltage $V_A$ received in the brightness control voltage input terminal 50. A voltage corresponding to a difference between the charging voltage and the voltage $V_A$ is generated in the collector of the transistor Q6 and supplied in a negative feedback manner to the collector of the transistor Q1 through the transistor Q2. When the brightness control voltage $V_A$ is maintained at a constant level, a video signal VS having a coincident pedestal level can be obtained as shown in FIG. 6A. The video signal VS including the DC component thus restored is supplied to the image amplifying part 9 from the emitter of the transistor Q1. The image amplifying part 9 amplifies the video signal VS received from the DC restoration circuit while performing white balance control on the video signal VS, to supply the same to the picture tube 10. In the video signal VS received in the picture tube 10, the DC component is restored to attain coincidence of the pedestal level as shown in FIG. 6A, whereby no unnaturalness is caused in the contrast of the image projected on the picture tube 10.

The aforementioned pulse width data 12 and the cycle of the clock pulses 18 are so controlled as to enable production of the clamp pulse CS having the optimum pulse width for the frequency of the synchronizing signal SS even if the frequency is changed. Thus, the pulse width of the clamp pulse CS will not exceed the back porch width of the blanking period of the video signal VS, dissimilarly to the conventional case. As the result, DC restoration is appropriately performed, so that no disturbance is caused in the contrast of the entire image.

Although the synchronizing signal SS and the clamp pulse CS are positive in the aforementioned embodiment, both or only one of the same may be negative. When both of the synchronizing signal SS and the clamp pulse CS are negative, the flip-flop 14 may be structured to fall on the leading edge of the synchronizing signal SS while the counter 15 may be structured to start counting on the trailinig edge of the output from the flip-flop 14 and to be reset when this output goes high. When only the clamp pulse CS is negative, the counter 15 may be structured to start counting in synchronization with the output from the flip-flop 14 and to be reset when this output goes high. When only the synchronizing signal SS is negative, the flip-flop 14 may be structured to fall on the leading edge of the synchronizing signal SS.

Although the present invention has been described and illustrated in detail, it is clearly understood that the same is by way of illustration and example only and is not to be taken by way of limitation, the spirit and scope of the present invention being limited only by the terms of the appended claims

What is claimed is:

1. A clamp pulse producing circuit contained in DC restoration means for produce a clamp pulse for use in restoring a DC component lost from a video signal, comprising:
   a first input means for receiving a synchronizing signal included in said video signal;
   pulse width data output means connected to said first input means for outputting pulse width data responsive to a frequency of said synchronizing signal;
   a flip-flop having first and second output states, which is connected to said first input means to enter the first output state in response to a trailing edge of said synchronizing signal;
   measuring means connected to said flip-flop for measurinig a period of said first output state of said flip-flop to output a result of measurement; and
   judging means connected to said pulse width data output means, said measuring means and said flip-flop for judging whether or not said pulse width data coincides with said result of measurement to output a first signal for bringing said flip-flop into said second output state upon a judgement on coincidence.

2. A clamp pulse producing circuit in accordance with claim 1, wherein
   said measuring means comprises a second input means for receiving clock pulses and a counter connected to said second input means, said flip-flop and said judging means for counting said clock pulses while said flip-flop is in said first output state, and
   said judging means includes a comparator which has one input connected to said pulse width data output means, another input connected to said counter and output connected to said flip-flop.

3. A clamp pulse producing circuit in accordance with claim 1, wherein
   said pulse width data output means includes means for detecting the frequency of said synchronizing signal and means for outputting said pulse width data in accordance with the frequency as detected.

4. A clamp pulse producing circuit in accordance with claim 1, wherein
   said first and second output states of said flip-flop is high and low level states, respectively.

5. A clamp pulse producing circuit in accordance with claim 1, wherein
   said first and second output states of said flip-flop is low and high level states, respectively.

6. A clamp pulse producing circuit in accordance with claim 1, wherein
   said synchronizing signal includes horizontal synchronizing signal.

7. A clamp pulse producing circuit in accordance with claim 2, wherein
   said counter is set in response to a leading edge of an output of said flip-flop and reset in response to said first signal.

8. A claim pulse producing circuit in accordance with claim 1, wherein:
   said synchronizing signal includes a vertical synchronizing signal.

* * * * *